UNITED STATES PATENT OFFICE.

HUGH A. GALT, OF BARBERTON, OHIO, ASSIGNOR TO COLUMBIA CHEMICAL COMPANY, OF BARBERTON, OHIO, A CORPORATION OF PENNSYLVANIA.

PROCESS OF UTILIZING LIME-MUD IN THE MANUFACTURE OF FERTILIZERS.

1,016,989. Specification of Letters Patent. Patented Feb. 13, 1912.

No Drawing. Application filed September 19, 1910. Serial No. 582,659.

*To all whom it may concern:*

Be it known that I, HUGH A. GALT, a citizen of the United States, and residing at Barberton, in the county of Summit and State of Ohio, have invented certain new and useful Improvements in Processes of Utilizing Lime-Mud in the Manufacture of Fertilizers, of which the following is a specification.

The invention relates to a process for treating phosphate rock with a lime mud or by-product, to the end that the phosphoric acid in the rock may be rendered soluble and available as a fertilizer, and the alkali by-product, which would otherwise be waste material, may be utilized advantageously.

The process, while applicable to all phosphate rocks, has been found particularly advantageous as applied to low grade phosphate rocks, to which the acid treatments commonly used are not profitably applicable.

In the manufacture of caustic soda on a commercial scale, soda ash or sodium carbonate is treated with lime with the following reaction,

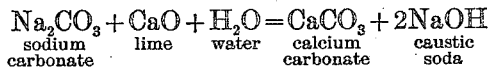

The caustic soda remains in solution and the precipitated calcium carbonate is separated by filtration. The calcium carbonate is washed with water to remove the caustic soda, but it is practically impossible to free all of the caustic soda from this calcium carbonate and the two substances constitute substantially a waste product known as lime mud.

In order to utilize the caustic soda in the alkali waste or lime mud which would thus otherwise be lost as well as the calcium carbonate, I mix the lime mud with phosphate rock and heat the mass in a furnace. The calcium carbonate is decomposed by the heat into carbonic acid and caustic lime, which latter prevents the mass from fluxing and leaves the soda free to unite with the phosphate elements of the rocks to form a soluble phosphate, the reactions depending upon the character of the phosphate rock and the process being applicable, I have found, to a wide variety of rocks. For example, when a mixture of lime mud is mixed in the proper proportions with pulverized phosphate rock and the mass heated to a temperature of approximately 2000° Fahr., the soda present in the lime mud combines with the phosphoric acid present in the phosphate rock forming a soluble sodium phosphate. In the case of the formation of normal sodium pyrophosphate the chemical reaction would be as follows:

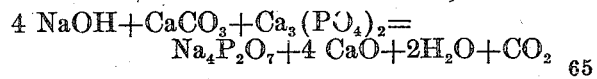

or in the case of tri sodium phosphate—

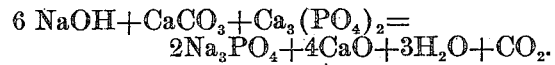

In both cases the water and carbonic acid are driven off.

If the amount of caustic soda remaining in the lime mud is insufficient to secure the necessary reaction, a further amount of a sodium alkali, such as soda ash or caustic soda, can be added to make up the deficiency. With low grade phosphate rock (such as the ordinary rejected southern silicious rock) and lime mud, produced as heretofore described and containing the usual amount of caustic soda, the following proportions have been found to give good results.

| | |
|---|---|
| Low grade phosphate rock | 1256 lbs. |
| Lime mud | 1570 " |
| Soda ash | 410 " |
| Water | 314 " |

When mixed as above, and thoroughly furnaced, about 2000 lbs. of finished fertilizer are secured, containing about 18% of soluble phosphate. Where the lime mud is not washed thoroughly, and the percentage of caustic soda remaining therein is large, the amount of soda ash or its equivalent may be reduced, or such compound entirely eliminated depending on the quantity of caustic soda remaining in the lime mud.

The percentage of soluble phosphoric acid is proportionately higher when higher phosphate rocks are used. The percentage of lime mud can also be varied so as to get the best results in the furnacing operation and still maintain a high percentage of soluble phosphoric acid in the furnaced mass.

Having thus described my invention and illustrated its use, what I claim as new and desire to secure by Letters Patent is the following:—

1. The process of utilizing lime mud comprising calcium carbonate and caustic soda in the manufacture of fertilizers, which comprises mixing the said lime mud with phosphate rock and furnacing the mass.

2. The process of utilizing the caustic soda remaining in lime mud after the treatment of sodium carbonate with lime and the separation of the body of the caustic soda from the calcium carbonate, which comprises mixing the said lime mud with phosphate rock and furnacing the mass.

3. The process of utilizing the caustic soda remaining in the lime mud produced in the manufacture of caustic soda and consisting of calcium carbonate and caustic soda, which comprises mixing the said lime mud with phosphate rock, and a sodium compound, and furnacing the mass.

4. The process of utilizing the caustic soda remaining in the lime mud produced in the manufacture of caustic soda and consisting of calcium carbonate and caustic soda, which comprises mixing the said lime mud with phosphate rock, and soda ash, and furnacing the mass.

5. The process of utilizing lime mud comprising calcium carbonate having a relatively small amount of caustic soda mixed therewith, which comprises mixing the said lime mud with phosphate rock, and a sodium compound and furnacing the mass.

6. The process of utilizing lime mud comprising calcium carbonate having a relatively small amount of caustic soda mixed therewith, which comprises mixing the said lime mud with phosphate rock, soda ash and water and furnacing the mass.

7. The herein described process of utilizing lime-mud in the manufacture of fertilizers, said process comprising the mixing of said lime-mud with phosphate rock, the decomposition of the calcium carbonate contained in said lime-mud by the action of heat in a furnace whereby the caustic lime which is produced under said heat action prevents the mass from fluxing and leaves the soda free to unite with the phosphate elements of the rocks in the formation of a soluble phosphate.

In testimony whereof I have hereunto signed my name in the presence of the two subscribed witnesses.

HUGH A. GALT.

Witnesses:
R. H. COPELAND,
E. W. HULL.